US011955793B2

United States Patent
Whitehouse et al.

(10) Patent No.: US 11,955,793 B2
(45) Date of Patent: Apr. 9, 2024

(54) CIRCUIT INTERRUPTION DEVICE

(71) Applicant: General Electric Technology GmbH, Baden (CH)

(72) Inventors: Robert Whitehouse, Stafford (GB); Andrzej Adamczyk, Stafford (GB)

(73) Assignee: General Electric Technology GmbH, Baden (CH)

( * ) Notice: Subject to any disclaimer, the term of this patent is extended or adjusted under 35 U.S.C. 154(b) by 142 days.

(21) Appl. No.: 17/798,429

(22) PCT Filed: Feb. 10, 2021

(86) PCT No.: PCT/EP2021/053209
§ 371 (c)(1),
(2) Date: Aug. 9, 2022

(87) PCT Pub. No.: WO2021/165119
PCT Pub. Date: Aug. 26, 2021

(65) Prior Publication Data
US 2023/0075016 A1 Mar. 9, 2023

(30) Foreign Application Priority Data
Feb. 21, 2020 (EP) .................................. 20275048

(51) Int. Cl.
*H02H 9/02* (2006.01)
*H01H 9/54* (2006.01)
*H02H 3/08* (2006.01)

(52) U.S. Cl.
CPC .............. *H02H 9/02* (2013.01); *H01H 9/542* (2013.01); *H02H 3/08* (2013.01)

(58) Field of Classification Search
CPC .......... H02H 9/02; H02H 1/00; H02H 1/0007; H02H 3/08; H02H 3/05; H02H 3/202;
(Continued)

(56) References Cited

U.S. PATENT DOCUMENTS

| 2012/0234796 A1* | 9/2012 | Juhlin .................. H01H 33/596 218/143 |
| 2016/0028520 A1 | 1/2016 | Lee et al. |
| 2016/0300671 A1* | 10/2016 | Ergin ..................... H01H 9/548 |

FOREIGN PATENT DOCUMENTS

| CN | 104638605 B | 2/2018 |
| DE | 102017122218 A1 | 3/2019 |

OTHER PUBLICATIONS

International Search Report and Written Opinion issued in PCT/EP2021/053209 dated Jun. 9, 2021, 13 pages.

* cited by examiner

*Primary Examiner* — Danny Nguyen
(74) *Attorney, Agent, or Firm* — Eversheds Sutherland (US) LLP

(57) ABSTRACT

A circuit interruption device including first and second terminals for connection, to a respective electrical circuit or network, a current-conductive branch including first, second, and third current-conductive branch portions successively connected in series between the first and second terminals, the first current-conductive branch portion including a first switching element, the second current-conductive branch portion including a second switching element, the third current-conductive branch portion including a third switching element, each switching element configured to be switchable to selectively permit and block a flow of current in the respective current-conductive branch portion, first and second current bypass paths, the first current bypass path connected across the first and second current-conductive branch portions, the second current bypass path connected across the second and third current-conductive branch portions, and a controller configured to selectively control the switching of the switching elements to control a flow of current between the first and second terminals.

13 Claims, 7 Drawing Sheets

(58) Field of Classification Search
CPC .......... H02H 3/16; H02H 3/021; H02H 7/268; H01H 9/542; H01H 9/541; H01H 2009/543; H01H 9/548
USPC ...................................................... 361/2–13
See application file for complete search history.

CIRCUIT INTERRUPTION DEVICE

CROSS-REFERENCE TO RELATED APPLICATIONS

This application is a U.S. National Stage Application under 35 U.S.C. § 371 and claims the priority benefit of International Application No. PCT/EP2021/053209, filed Feb. 10, 2021, which claims priority to European Application No. 20275048.5, filed Feb. 21, 2020, both of which are incorporated herein by reference.

This invention relates to a circuit interruption device, circuit interruption assemblies, a method of operating a circuit interruption device and methods of operating circuit interruption assemblies, preferably for use in medium voltage and high voltage applications.

It is known to use a circuit breaker to disconnect electrical equipment from either or both of AC and DC electrical networks to prevent an uncontrolled fault current from flowing through the electrical equipment. However, conventional AC circuit breakers have slow response times and thereby are incapable of interrupting the fault current before it rises beyond unacceptable limits, while conventional high-speed DC circuit breakers have insufficient current and voltage ratings to be used in power transmission networks. In addition, after the original fault has been removed, it takes a considerable amount of time to reclose the circuit breaker, thus adding a further delay before normal operation of the electrical equipment can be resumed.

According to a first aspect of the invention, there is provided a circuit interruption device comprising:
first and second terminals for connection, in use, to a respective electrical circuit or network;
a current-conductive branch including first, second and third current-conductive branch portions successively connected in series between the first and second terminals, the first current-conductive branch portion including a first switching element, the second current-conductive branch portion including a second switching element, the third current-conductive branch portion including a third switching element, each switching element configured to be switchable to selectively permit and block a flow of current in the respective current-conductive branch portion;
first and second current bypass paths, the first current bypass path connected across the first and second current-conductive branch portions, the second current bypass path connected across the second and third current-conductive branch portions; and
a controller configured to selectively control the switching of the switching elements to control a flow of current between the first and second terminals so that:
(i) in a first mode of operation of the circuit interruption device, the current is permitted to flow through the first, second and third current-conductive branch portions and is blocked from flowing through the current bypass paths; and
(ii) in a second mode of operation of the circuit interruption device, the current is blocked from flowing through the first and third current-conductive branch portions and is permitted to flow through the current bypass paths so as to reverse a direction of current flowing through the second current-conductive branch portion.

During normal operation, the circuit interruption device is operated in its first mode of operation to enable current to flow freely therethrough between the first and second terminals and thereby permit the operation of the associated electrical circuit or network. However, under certain circumstances, it may be necessary to interrupt the flow of current in the associated electrical circuit or network. Such circumstances may include, but are not limited to, a fault or other abnormal operating condition in the electrical circuit or network that results in a high fault current, shutdown of the electrical circuit or network, and repair, testing or maintenance of the electrical circuit or network.

The arrangement of the current-conductive branch portions and current bypass paths between the first and second terminals of the circuit interruption device of the invention enables the control of the switching elements to create an alternative current path for the current flowing between the first and second terminals so that the flow of current through the second switching element is temporarily reversed in order to force a current zero and thereby enable turn-off of the second switching element. This in turn facilitates limitation or interruption of the current flowing through the circuit interruption device.

The configuration of the circuit interruption device of the invention is advantageous in that it requires fewer switching components than a conventional circuit interruption device to carry out the function of limiting or interrupting a current, thus providing comparative reductions in terms of size, weight, cost and conduction losses.

In embodiments of the invention, the controller may be configured to selectively control the switching of the switching elements to control the flow of current between the first and second terminals so that, in a third mode of operation of the circuit interruption device, the current is blocked from flowing through the second current-conductive branch portion and is permitted to flow through the first and third current-conductive branch portions and the current bypass paths.

Operating the circuit interruption device in the third mode of operation enables the current flowing between the first and second terminals to bypass the second current-conductive branch portion as part of the current limiting or interrupting function of the circuit interruption device.

In further embodiments of the invention, the first current bypass path may include a first energy storage device and/or the second current bypass path may include a second energy storage device. The provision of the first energy storage device in the first current bypass path and/or the second energy storage device in the second current bypass path enables the current flowing through the current bypass path(s) to charge the or each energy storage device in order to provide an opposing voltage that opposes the flow of current through the current bypass path(s), thus enhancing the current limitation or interruption capability of the circuit interruption device.

In still further embodiments of the invention, the circuit interruption device may include a third current bypass path connected across the first and second terminals, the third current bypass path including a third energy storage device. The provision of the third energy storage device in the third current bypass path not only enables the current flowing through the third current bypass path to charge the third energy storage device in order to provide an opposing voltage that opposes the flow of current through the third current bypass path, thus enhancing the current limitation or interruption capability of the circuit interruption device, but also reduces the overall energy storage device requirements of the circuit interruption device, thus providing cost, size and weight savings.

The or each energy storage device may be any device capable of storing and releasing energy to selectively provide a voltage, such as a capacitor, a fuel cell or a battery.

Optionally the circuit interruption device may include a first energy dissipation or absorption device connected across the second current-conductive branch portion. The controller may be configured to selectively control the switching of the switching elements to control the flow of current between the first and second terminals so that, in a fourth mode of operation of the circuit interruption device, the current is blocked from flowing through the second current-conductive branch portion and the current bypass paths and is permitted to flow through the first and third current-conductive branch portions and the first energy dissipation or absorption device.

Operating the circuit interruption device in the fourth mode of operation enables the first energy dissipation or absorption device to absorb energy to limit the voltage of the second current-conductive branch portion and thereby limit the overall voltage of the circuit interruption device to acceptable values.

Further optionally, the circuit interruption device may include at least one of:
- a second energy dissipation or absorption device connected across the first and second terminals;
- a third energy dissipation or absorption device connected across the first current bypass path;
- a fourth energy dissipation or absorption device connected across the second current bypass path;
- a fifth energy dissipation or absorption device connected across the first switching element in the first current-conductive branch portion;
- a sixth energy dissipation or absorption device connected across the third switching element in the third current-conductive branch portion.

The inclusion of one, some or all of the second, third, fourth, fifth and sixth energy dissipation or absorption devices in the circuit interruption device enables the absorption of energy to limit the overall voltage of the circuit interruption device to acceptable values.

Each energy dissipation or absorption device may be in the form of a resistive element, preferably a non-linear resistive element such as a metal-oxide surge arrester, or may be in the form of an energy storage device.

Each of the first and third switching elements may be, but is not limited to, an electronic switching element. Examples of electronic switching elements include a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated semiconductor device. Each electronic switching element may be a wide-bandgap material-based switching element or a silicon semiconductor-based switching element. Examples of wide-bandgap materials include, but are not limited to, silicon carbide, boron nitride, gallium nitride and aluminium nitride.

The second switching element may be, but is not limited to, a mechanical switching element. Examples of mechanical switching elements include a vacuum switching element or a gas insulated switching element, such as an $SF_6$ insulated switching element.

Each of the first and third switching elements may be a unidirectional switching element. Alternatively each of the first and third switching elements may be a bidirectional switching element. The bidirectional switching element may be or may include a pair of anti-parallel connected switching devices.

The invention is applicable to both DC and AC circuit interruption devices. A DC circuit interruption device may be any device that is capable of interrupting direct current flow in a DC circuit or network. Such a DC circuit interruption device may be, but is not limited to, a DC circuit breaker. An AC circuit interruption device may be any device that is capable of interrupting alternating current flow in an AC circuit or network, including sub-cycle and non-zero current interruption. Such an AC circuit interruption device may be, but is not limited to, an AC circuit breaker.

According to a second aspect of the invention, there is provided a circuit interruption assembly comprising at least one circuit interruption device connected in series with at least one isolator, wherein the or each circuit interruption device is in accordance with any one of the first aspect of the invention and its embodiments described hereinabove.

The features and advantages of the circuit interruption device of the first aspect of the invention and its embodiments apply mutatis mutandis to the circuit interruption assembly of the second aspect of the invention and its embodiments.

Following operation of the circuit interruption device, a residual current may continue to flow through the circuit interruption device, which may lead to unwanted heating of one or more components of the circuit interruption device. The or each isolator may be operated to isolate the circuit interruption device from the electrical circuit(s) or network(s) in order to block the flow of the residual current.

According to a third aspect of the invention, there is provided a circuit interruption assembly comprising a plurality of circuit interruption devices, each circuit interruption device in accordance with any one of the first aspect of the invention and its embodiments described hereinabove, wherein each controller of the circuit interruption devices is configured to control the switching of the switching elements of the corresponding circuit interruption device so that the circuit interruption devices initiate the same mode of operation at the same time or at different times.

The features and advantages of the circuit interruption device of the first aspect of the invention and its embodiments apply mutatis mutandis to the circuit interruption assembly of the third aspect of the invention and its embodiments.

Configuring the circuit interruption devices and controllers in this manner provides several benefits including, but not limited to:
- enabling reductions in physical size and weight of the circuit interruption assembly;
- enabling a modular design approach of the circuit interruption assembly that is applicable to different circuit interruption requirements;
- providing inbuilt redundancy to improve availability of the current limitation or interruption function;
- permitting in-service operation of one or more individual circuit interruption devices for routine testing purposes;
- optimisation of the properties of the current limitation or interruption function of the circuit interruption assembly;
- coordination of the operations of the circuit interruption devices to provide a wide range of current limitation or interruption functions.

In embodiments of the invention, at least one of the plurality of circuit interruption devices may have a voltage rating that is the same as or different to at least one other of the plurality of circuit interruption devices.

In embodiments of the invention employing the use of one or more energy storage devices, at least one of the plurality of circuit interruption devices may have an energy storage device rating that is the same as or different to at least one other of the plurality of interruption devices.

The voltage ratings and/or the energy storage device ratings of the circuit interruption devices may be optimised to not only provide cost, size and weight savings but also enable specific current limitation or interruption functions.

According to a fourth aspect of the invention, there is provided a method of operating a circuit interruption device, the circuit interruption device comprising:

first and second terminals for connection, in use, to a respective electrical circuit or network;

a current-conductive branch including first, second and third current-conductive branch portions successively connected in series between the first and second terminals, the first current-conductive branch portion including a first switching element, the second current-conductive branch portion including a second switching element, the third current-conductive branch portion including a third switching element, each switching element configured to be switchable to selectively permit and block a flow of current in the respective current-conductive branch portion; and first and second current bypass paths, the first current bypass path connected across the first and second current-conductive branch portions, the second current bypass path connected across the second and third current-conductive branch portions, wherein the method comprises the steps of:

selectively controlling the switching of the switching elements in a first mode of operation of the circuit interruption device so that a flow of current between the first and second terminals is permitted to flow through the first, second and third current-conductive branch portions and is blocked from flowing through the current bypass paths; and selectively controlling the switching of the switching elements in a second mode of operation of the circuit interruption device so that the current is blocked from flowing through the first and third current-conductive branch portions and is permitted to flow through the current bypass paths so as to reverse a direction of current flowing through the second current-conductive branch portion.

The features and advantages of the circuit interruption device of the first aspect of the invention and its embodiments apply mutatis mutandis to the method of the fourth aspect of the invention and its embodiments.

The method of the fourth aspect of the invention may include the step of selectively controlling the switching of the switching elements in a third mode of operation of the circuit interruption device so that the current is blocked from flowing through the second current-conductive branch portion and is permitted to flow through the first and third current-conductive branch portions and the current bypass paths.

In the method of the fourth aspect of the invention, the first current bypass path may include a first energy storage device and/or the second current bypass path may include a second energy storage device.

In the method of the fourth aspect of the invention, the circuit interruption device may include a third current bypass path connected across the first and second terminals, the third current bypass path including a third energy storage device.

In the method of the fourth aspect of the invention, the circuit interruption device may include a first energy dissipation or absorption device connected across the second current-conductive branch portion, and the method may include the step of selectively controlling the switching of the switching elements in a fourth mode of operation so that the current is blocked from flowing through the second current-conductive branch portion and the current bypass paths and is permitted to flow through the first and third current-conductive branch portions and the first energy dissipation or absorption device.

In the method of the fourth aspect of the invention, the circuit interruption device may include at least one of:

a second energy dissipation or absorption device connected across the first and second terminals;

a third energy dissipation or absorption device connected across the first current bypass path;

a fourth energy dissipation or absorption device connected across the second current bypass path;

a fifth energy dissipation or absorption device connected across the first switching element in the first current-conductive branch portion;

a sixth energy dissipation or absorption device connected across the third switching element in the third current-conductive branch portion.

In the method of the fourth aspect of the invention, each of the first and third switching elements may be a unidirectional switching element or each of the first and third switching elements may be a bidirectional switching element.

According to a fifth aspect of the invention, there is provided a method of operating a circuit interruption assembly, the circuit interruption assembly comprising at least one circuit interruption device connected in series with at least one isolator, the or each circuit interruption device in accordance with any one of the first aspect of the invention and its embodiments described hereinabove, the method comprising the step of operating the or each circuit interruption device in accordance with any one of the method of the fourth aspect of the invention and its embodiments described hereinabove followed by the step of opening the or each isolator.

The features and advantages of the circuit interruption assembly of the second aspect of the invention and its embodiments apply mutatis mutandis to the method of the fifth aspect of the invention and its embodiments.

According to a sixth aspect of the invention, there is provided a method of operating a circuit interruption assembly, the circuit interruption assembly comprising a plurality of circuit interruption devices, each circuit interruption device in accordance with any one of the first aspect of the invention and of its embodiments described hereinabove, wherein the method comprises the steps of:

operating each circuit interruption device in accordance with any one of the method of the fourth aspect of the invention and its embodiments described hereinabove; and selectively controlling the switching of the switching elements of each circuit interruption device so that the circuit interruption devices initiate the same mode of operation at the same time or at different times.

The features and advantages of the circuit interruption assembly of the third aspect of the invention and its embodiments apply mutatis mutandis to the method of the sixth aspect of the invention and its embodiments.

Preferably the plurality of circuit interruption devices are connected in series.

In the method of the sixth aspect of the invention, at least one of the plurality of circuit interruption devices may have a voltage rating that is the same as or different to at least one other of the plurality of circuit interruption devices.

In the method of the sixth aspect of the invention, at least one of the plurality of circuit interruption devices may have an energy storage device rating that is the same as or different to at least one other of the plurality of interruption devices.

The term "across" is interchangeable with "in parallel" in the context of describing a connection of two electrical components, elements or sections. For example, if an electrical component is connected across another electrical component, the electrical component is connected in parallel with the other electrical component.

It will be understood that the controller may be implemented as a single control unit or a plurality of control units. For example, the controller may include a plurality of control units, each of which is configured to control a respective switching element of the circuit interruption device. Each control unit may be configured to communicate with at least one other control unit via telecommunications links.

In embodiments employing a plurality of controllers, the controllers may be implemented as separate controllers or may be implemented as part of the same control system. Each controller may be configured to communicate with at least one other controller via telecommunications links. When the controllers are implemented as part of the same control system, each controller may be configured to communicate with a central controller via telecommunications links.

It will be appreciated that the use of the terms "first" and "second", and the like, in this patent specification is merely intended to help distinguish between similar features (e.g. the first and second terminals, the first, second and third current-conductive branch portions, the first, second, third and fourth modes of operation, etc.), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

Preferred embodiments of the invention will now be described, by way of non-limiting examples, with reference to the following drawings in which.

The figures are not necessarily to scale, and certain features and certain views of the figures may be shown exaggerated in scale or in schematic form in the interests of clarity and conciseness.

Figure 1:
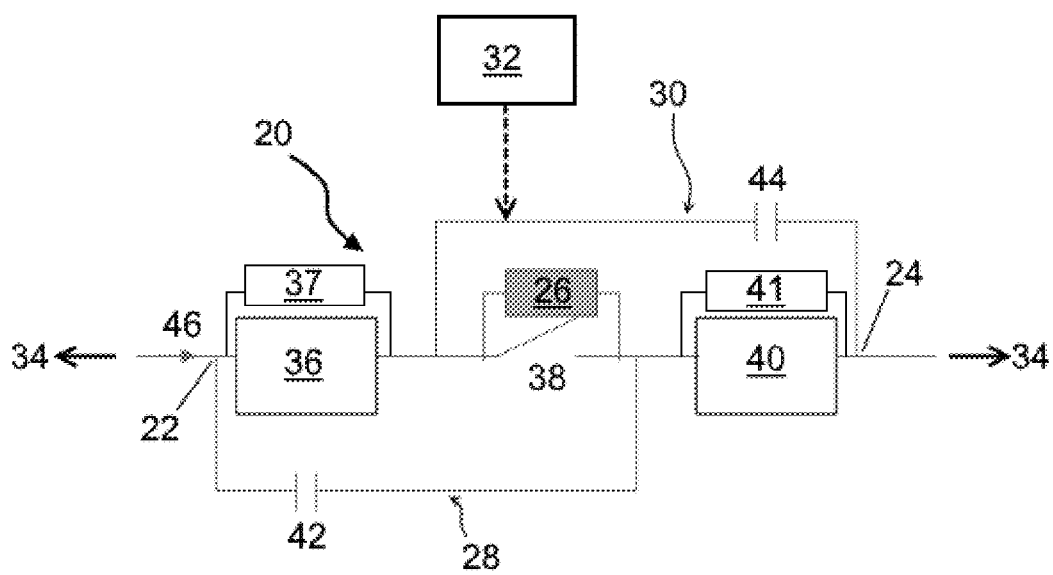
FIG. 1 shows a circuit interruption device according to a first embodiment of the invention.

A circuit interruption device according to a first embodiment of the invention is shown in FIG. 1 and is designated generally by the reference numeral 20.

The circuit interruption device 20 is a circuit breaker that comprises first and second terminals 22,24, a current-conductive branch, a first energy dissipation or absorption device 26, first and second current bypass paths 28,30 and a controller 32. In use, the first and second terminals 22,24 are connected to a respective DC electrical circuit or network 34.

The current-conductive branch includes first, second and third current-conductive branch portions successively connected in series between the first and second terminals 22,24. The first, second and third current-conductive branch portions respectively include a first switching element 36, a second switching element 38 and a third switching element 40. In this manner each switching element 36,38,40 is configured to be switchable to selectively permit and block a flow of current in the respective current-conductive branch portion.

Each of the first and third switching elements 36,40 is a low voltage, bidirectional electronic switching element with a parallel-connected energy dissipation or absorption device 37,41 such as a non-linear resistor and/or a surge arrester. The second switching element 38 is a high voltage, mechanical switching element. Non-limiting examples of electronic switching elements and mechanical switching elements are described elsewhere in this specification. It is envisaged that, in other embodiments of the invention, each of the first and third electronic switching elements may include a plurality of electronic switching devices (e.g. series-connected and/or parallel-connected electronic switching devices) and/or the second mechanical switching element may include a plurality of mechanical switches (e.g. series-connected and/or parallel-connected mechanical switches).

The first energy dissipation or absorption device 26 is connected across the second current-conductive branch portion. The first energy dissipation or absorption device 26 is in the form of a zinc oxide surge arrester but in other embodiments may take the form of another type of resistive element.

The first current bypass path 28 is connected across the first and second current-conductive branch portions. The second current bypass path 30 is connected across the second and third current-conductive branch portions. The first and second current bypass paths 28,30 respectively include first and second energy storage devices 42,44. Each energy storage device 42,44 is a capacitor but in other embodiments may take the form of another type of device capable of storing and releasing energy to selectively provide a voltage, such as a fuel cell or a battery.

The controller 32 is configured, e.g. programmed, to selectively open and close each switching element 36,38,40 to control a flow of current in the respective current-conductive branch portion and thereby control a flow of current between the first and second terminals 22,24.

Operation of the circuit interruption device 20 of FIG. 1 is described as follows with reference to FIGS. 2a to 2f and 3a to 3c.

Figure 2A:
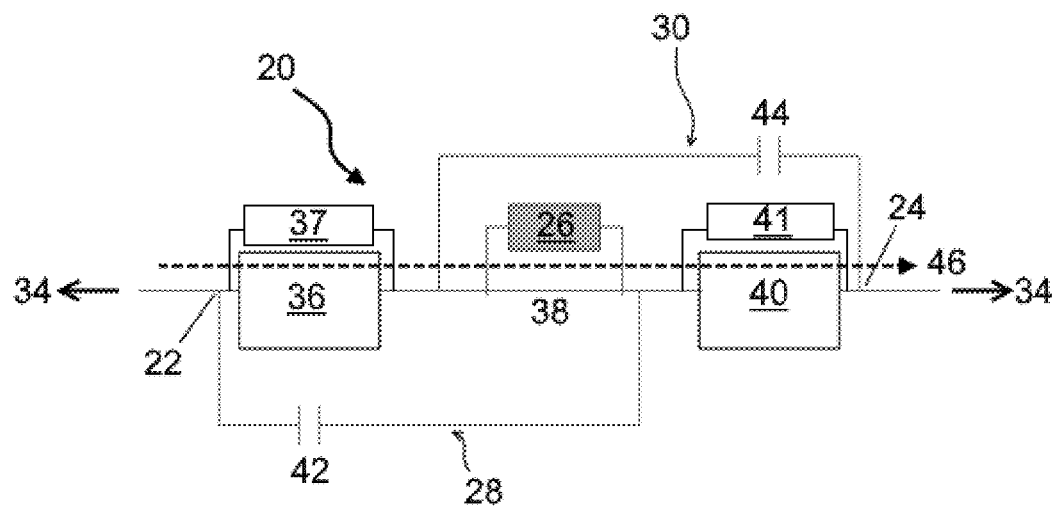
FIGS. 2a to 2f illustrate a current interruption operation of the circuit interruption device of FIG. 1.

During normal operation, the circuit interruption device 20 is operated in a first mode of operation by closing the first, second and third switching elements 36,38,40 so that current 46 is permitted to flow through the first, second and third current-conductive branch portions and is blocked from flowing through the current bypass paths 28,30. As shown in FIG. 2a, this enables the current 46 to flow freely between the first and second terminals 22,24 and thereby permit the normal operation of the associated DC electrical circuits or networks 34.

There may be a requirement to interrupt the flow of current in the associated DC electrical circuits or networks 34 under certain circumstances such as a fault or other abnormal operating condition in the DC electrical circuits or networks 34 that results in a high fault current, shutdown of the DC electrical circuits or networks 34, and repair, testing or maintenance of the DC electrical circuits or networks 34.

Figure 2B:
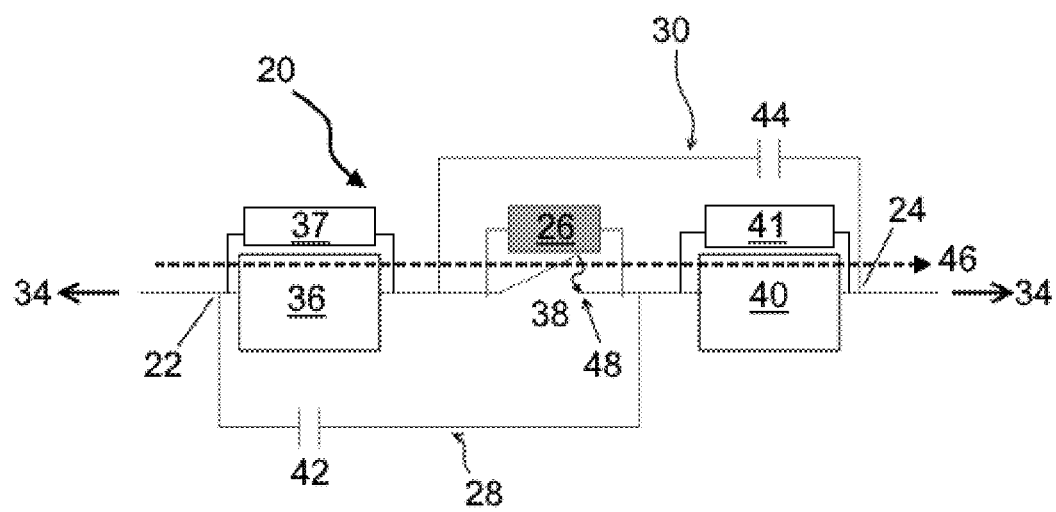

As shown in FIG. 2b, the second mechanical switching element 38 is then opened, which causes an arc 48 to be drawn between contacts of the second mechanical switching element 38. The presence of the arc 48 means that the current 46 continues to flow between the first and second terminals 22,24 through the first, second and third current-conductive branch portions.

After a sufficient separation gap between the contacts of the second mechanical switching element 38 is achieved, the first and third electronic switching elements 36, 40 are opened in a second mode of operation of the circuit interruption device 20. The time between the opening of the second mechanical switching element 38 and the opening of the first and third electronic switching elements 36,40 is kept as short as possible to minimise arc erosion of the contacts of the second mechanical switching element 38.

Figure 2C:
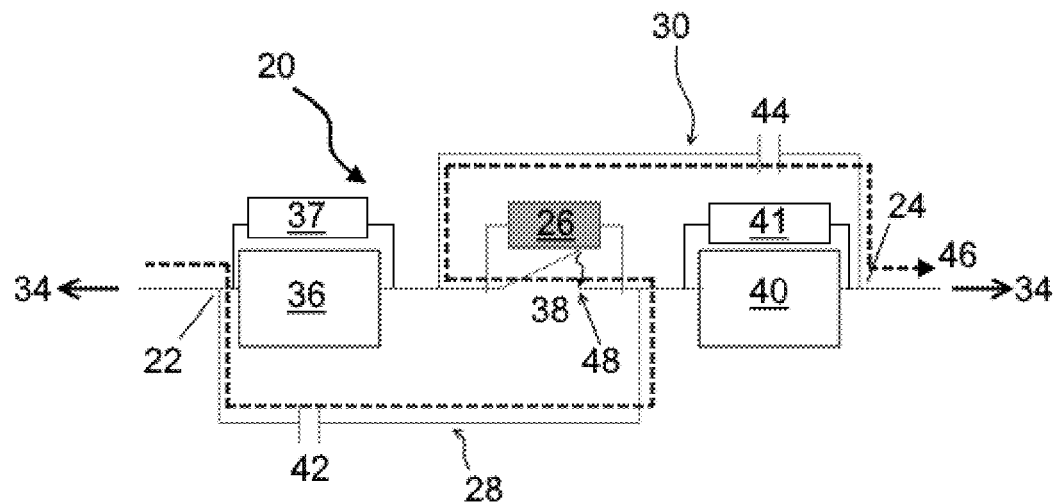

Hence, in the second mode of operation as shown in FIG. 2c, the current 46 is blocked from flowing through the first and third current-conductive branch portions, which causes the current 46 to flow through the capacitors 42,44 in the current bypass paths 28,30. As a result of the configuration of the current bypass paths 28,30, the direction of current 46 flowing through the second mechanical switching element 38 is reversed, thus forcing a current zero in the second mechanical switching element 38 and thereby allowing the arc 48 in the second mechanical switching element 38 to be extinguished. The time required to achieve the forced current zero is determined by the voltage ratings of the first and third electronic switching elements 36,40 and the capacitance values of the first and second capacitors 42,44.

Figure 2D:
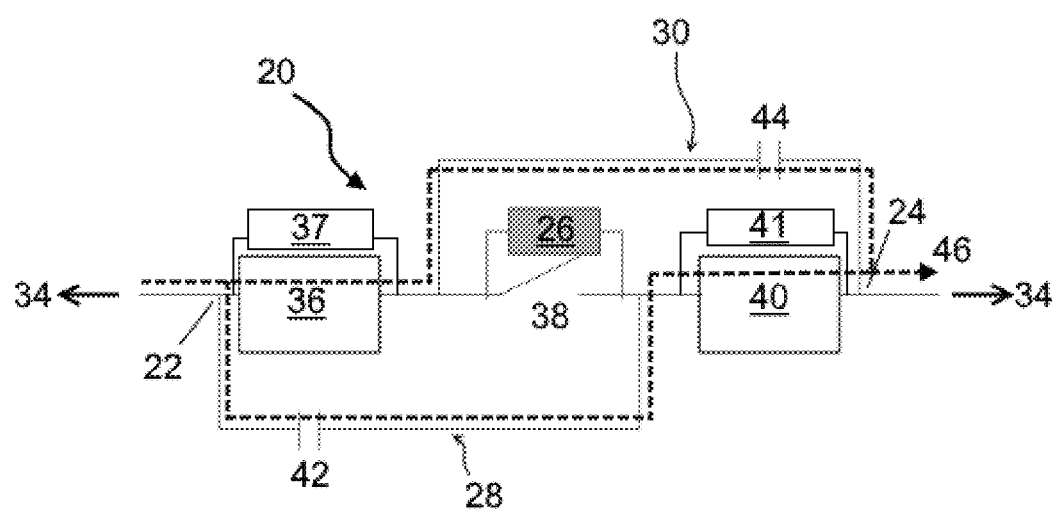

The current flowing through the capacitors 42,44 will create a respective voltage across each of the capacitors 42,44 which upon reaching the voltage rating of the parallel-connected non-linear resistors or surge arresters 37,41 in the first and third current-conductive branch portions will cause the current 46 flowing between the first and second terminals 22,24 to flow through two parallel circuits in a third mode of operation of the circuit interruption device 20 shown in FIG. 2d. Additionally or alternatively the controlled closure of the first and third electronic switching elements 36,40 will cause the current 25 46 flowing between the first and second terminals 22,24 to flow through two parallel circuits in a third mode of operation of the circuit interruption device 20 shown in FIG. 2d. The first parallel circuit comprises the first current-conductive branch portion and the second current bypass path 30. The second parallel circuit comprises the third current-conductive branch portion and the first current bypass path 28. Meanwhile the current 46 continues to be blocked from flowing through the second current-conductive branch portion.

The flow of current 46 through the two parallel circuits charges the first and second capacitors 42,44 so that each capacitor 42,44 provides an opposing voltage that opposes the flow of current 46 through the respective parallel circuit. In this way the first and second capacitors 42,44 in combination can be charged to provide a sufficiently high opposing voltage to stop the flow of current 46 between the first and second terminals 22,24. During this period the rate of change of voltage across the second mechanical switching element 38 will be determined by the capacitance values of the first and second capacitors 42,44 and the magnitude of the current 46 flowing between the first and second terminals 22,24, and can be set to a value suitable for the capability of the contacts of the second mechanical switching element 38.

Figure 2E:
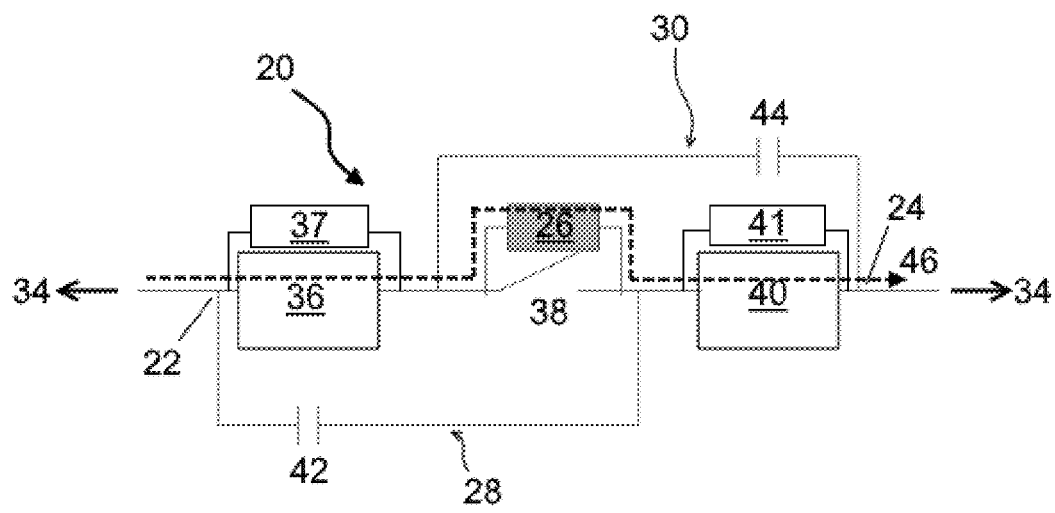

The third mode of operation is followed by a fourth mode of operation of the circuit interruption device 20 shown in FIG. 2e in which the first and third electronic switching elements 36,40 are either closed to permit current to flow therethrough or opened so that the current flows through the corresponding parallel-connected non-linear resistors or surge arresters 37,41 and the second mechanical switching element 38 stays open. In the fourth mode of operation, the current 46 is blocked from flowing through the second current-conductive branch portion and the current bypass paths 28,30 due to the open second mechanical switching element 38 and the charged first and second capacitors 42,44, and the current 46 is permitted to flow through the first and third current-conductive branch portions and the first energy dissipation or absorption device 26. This enables the first energy dissipation or absorption device 26 to absorb energy to limit the voltage of the second current-conductive branch portion and thereby limit the overall voltage of the circuit interruption device 20 to acceptable values.

Figure 2F:
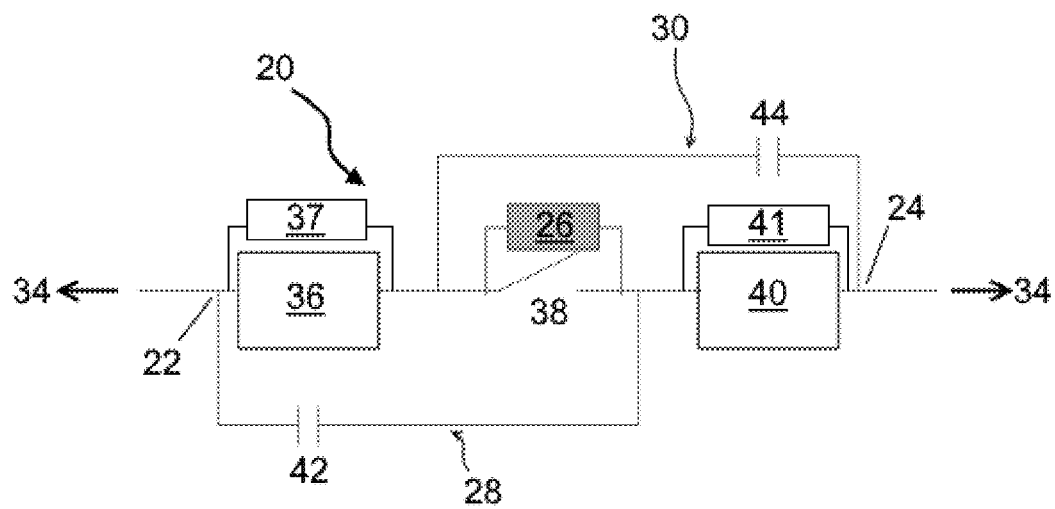

FIG. 2f shows the state of the circuit interruption device 20 when the current 46 is successfully interrupted.

Figure 3A:
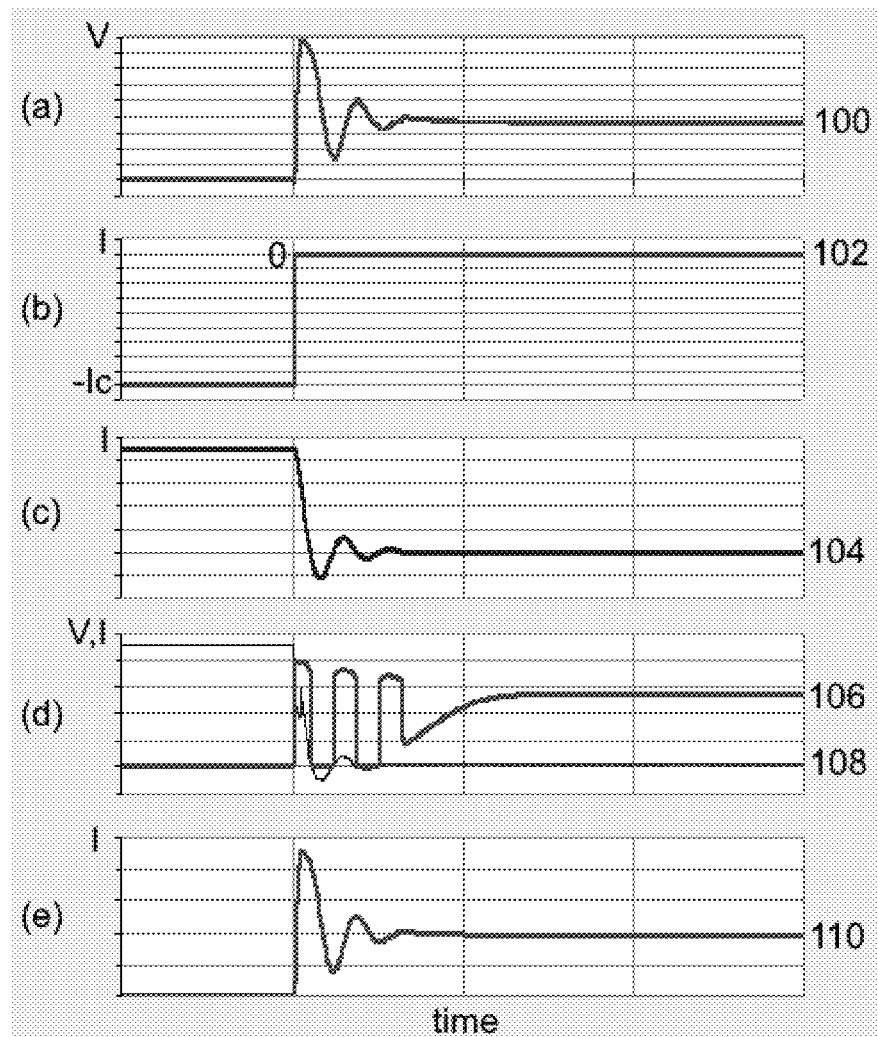
FIGS. 3a to 3c illustrate an electrical behaviour of the circuit interruption device of FIG. 1 during a current interruption operation.

Graphs a, b, c, d and e of FIG. 3a respectively illustrate the change in contact voltage 100 of the second mechanical switching element 38 (graph a), the change in contact current 102 of the second mechanical switching element 38 (graph b), the change in current 104 flowing between the first and second terminals 22,24 (graph c), changes in voltage and current 106,108 of each electronic switching element 36,40 (graph d) and the change in voltage 110 of each capacitor 42,44 (graph e) during the opening of the circuit interruption device 20 of FIG. 1. Graphs a, b and c of FIG. 3b correspond to graphs a, b and c of FIG. 3a but on expanded timescales. Graphs a and b of FIG. 2 correspond to graphs a and b of FIGS. 3a and 3b but on further expanded timescales.

Figure 3B:
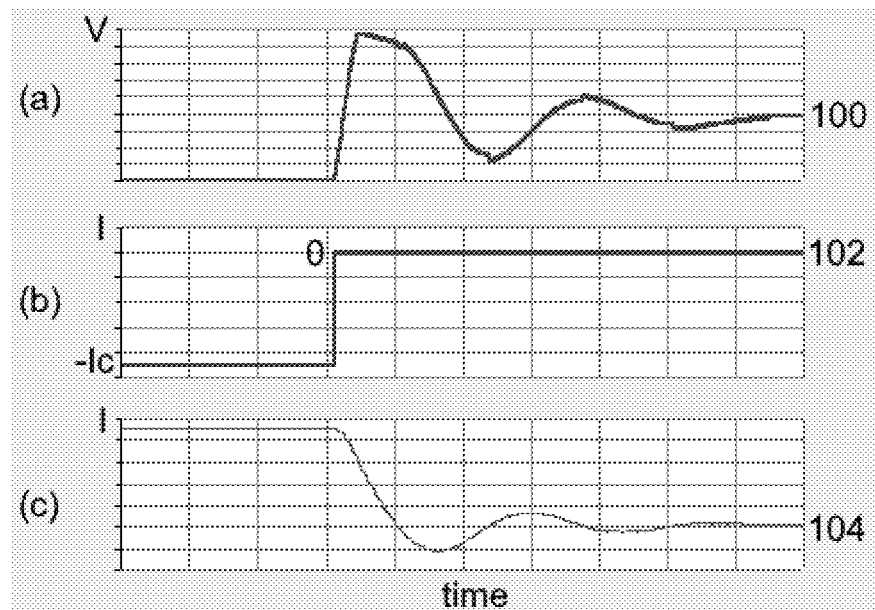
Figure 3C:
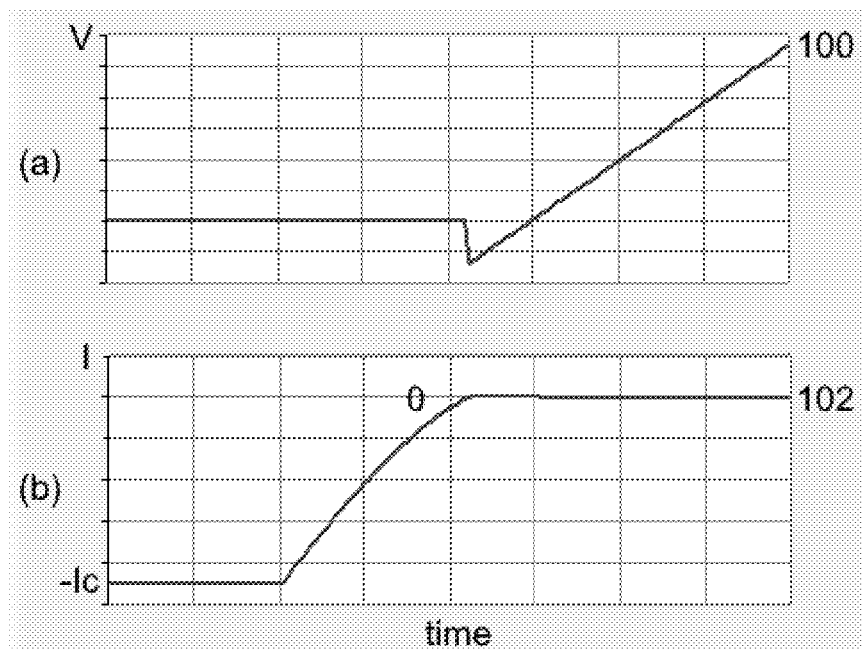

It can be seen from FIGS. 3a to 3c that the reduction of the current 110 flowing between the first and second terminals 22,24 of the circuit interruption device 20 is achieved through the combination of the opening of the second mechanical switching element 38, the opening of the first and third electronic switching elements 36,40 and the charging of the capacitors 42,44 to provide the opposing voltages.

The configuration of the circuit interruption device 20 of FIG. 1 therefore provides a current limitation or interruption function through the control of switching elements 36,38,40 and the use of passive components 42,44 to create an alternative current path for the current 46 flowing between the first and second terminals 22,24 that forces a current zero and thereby enables turn-off of the second mechanical switching element 48. Such a configuration of the circuit interruption device 20 of FIG. 1 requires fewer switching components than a conventional circuit interruption device to carry out the function of limiting or interrupting a current, thus providing comparative reductions in terms of size, weight, cost and conduction losses.

Figure 4:
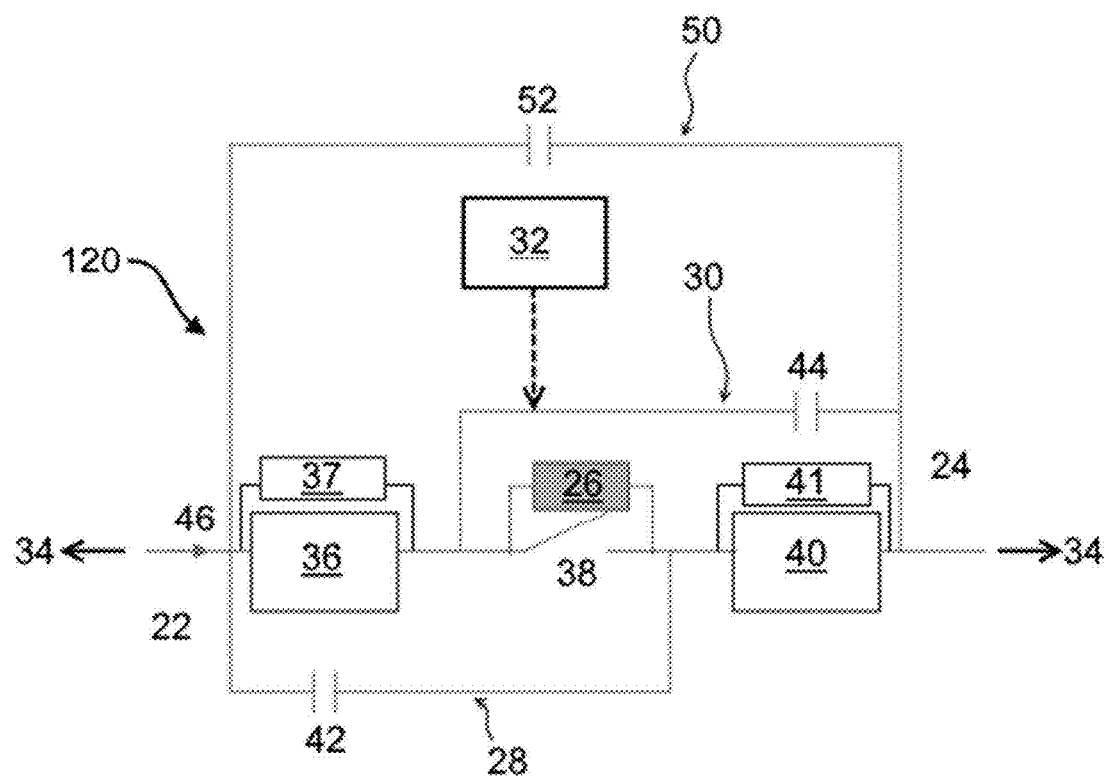
FIG. 4 shows a circuit interruption device according to a second embodiment of the invention.

A circuit interruption device according to a second embodiment of the invention is shown in FIG. 4 and is designated generally by the reference numeral 120. The circuit interruption device 120 of FIG. 4 is similar in structure and operation to the circuit interruption device 20 of FIG. 1, and like features share the same reference numerals.

The circuit interruption device 120 of FIG. 4 differs from the circuit interruption device 20 of FIG. 1 in that the circuit interruption device 120 of FIG. 4 includes a third current bypass path connected across the first and second terminals 22,24. The third current bypass path 50 includes a third energy storage device 52 that is a capacitor but in other embodiments may take the form of another type of device capable of storing and releasing energy to selectively provide a voltage, such as a fuel cell or a battery.

During the operation of the circuit interruption device 120 to stop the flow of current between the first and second terminals 22,24, the current 46 flows through the third current bypass path 50 so as to charge the third capacitor 52 so that it provides an opposing voltage that opposes the flow of current between the first and second terminals 22,24. The inclusion of the third capacitor 52 alongside the first and second capacitors 42,44 in the circuit interruption device 120 has the effect of reducing the overall capacitance requirements of the circuit interruption device 120, thus providing cost, size and weight savings.

Either of the circuit interruption devices 20,120 of FIGS. 1 and 4 may include at least one of:
- a second energy dissipation or absorption device connected across the first and second terminals 22,24;
- a third energy dissipation or absorption device connected across the first current bypass path 28;
- a fourth energy dissipation or absorption device connected across the second current bypass path 30.

Each of the second, third and fourth energy dissipation or absorption devices is in the form of a zinc oxide surge arrester but in other embodiments may take the form of another type of resistive element.

The inclusion of one, some or all of the second, third and fourth energy dissipation or absorption devices in the circuit interruption device 20,120 enables the absorption of energy to limit the overall voltage of the circuit interruption device 20,120 to acceptable values.

In either of the circuit interruption devices 20,120 of FIGS. 1 and 4, the or each surge arrester 26 may be required to be set to a value that results in a residual current flow when the circuit interruption device is open, which may lead to unacceptable heating of the or each surge arrester 26. Connecting the circuit interruption device 20,120 in series with at least one isolator enables the operation of the or each isolator to isolate the circuit interruption device 20,120 from the DC electrical circuit(s) or network(s) 34 in order to block the flow of the residual current.

A higher voltage rating of the circuit interruption device 20,120 can be realised by increasing the voltage ratings of its individual components. An alternative approach is to use two or more series-connected circuit interruption devices 20,120, each of which is configured to have a voltage rating that is less than the overall required voltage rating.

Figure 5:
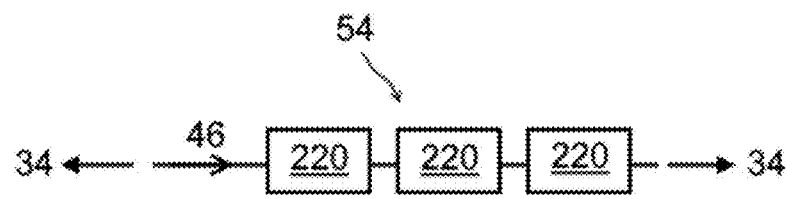
FIG. 5 shows a circuit interruption assembly according to a third embodiment of the invention.

A circuit interruption assembly 54 according to a third embodiment of the invention is shown in FIG. 5.

The circuit interruption assembly 54 comprises a plurality of series-connected circuit interruption devices, each of which is designated generally by the reference numeral 220.

Each circuit interruption device 220 is similar in structure and operation to the circuit interruption device 20,120 of FIG. 1 or FIG. 4, and like features share the same reference numerals. In the embodiment shown, the circuit interruption assembly 54 includes three circuit interruption devices 220 but in other embodiments may include a different number of multiple circuit interruption devices.

At least one of the plurality of circuit interruption devices 220 may have a voltage rating that is the same as or different to at least one other of the plurality of circuit interruption devices 220. At least one of the plurality of circuit interruption devices 220 may have an energy storage device rating that is the same as or different to at least one other of the plurality of interruption devices 220.

Each controller 32 of the circuit interruption devices 220 is configured to control the switching of the switching elements 36,38,40 of the corresponding circuit interruption device 220 so that the circuit interruption devices 220 initiate the same mode of operation at the same time or at different times. For example, one or more circuit interruption devices 220 with a relatively low voltage rating and a relatively large capacitance rating may be operated to initially limit a high flow of current followed by the operation of one or more other circuit interruption devices 220 with a higher voltage rating and a lower capacitance rating to further limit or stop the flow of current that is reduced due to the initial limitation of the flow of current.

The configuration of the circuit interruption assembly 54 of FIG. 1 provide several benefits such as:
- The overall voltage ratings and capacitance values of the capacitors 42,44,52 may be reduced in order to reduce the physical size and weight of the circuit interruption assembly 54;
- A modular design approach can be adopted when configuring the circuit interruption assembly 54 to meet different circuit interruption requirements. For example, the number of circuit interruption devices 220 can be set depending on the voltage ratings of the associated DC electrical circuits or networks 34;
- The circuit interruption assembly 54 may have one or more redundant circuit interruption devices 220, thus providing inbuilt redundancy to improve availability of the current limitation or interruption function;
- The inclusion of multiple circuit interruption devices 220 in the circuit interruption assembly 54 permits in-service operation of one or more individual circuit interruption devices 220 for routine testing purposes, without removing the availability of the current limitation or interruption function;
- The ratings of the individual components of each circuit interruption device 220 may be designed to optimise the properties of the current limitation or interruption function of the circuit interruption assembly 54;
- The operations of the circuit interruption devices 220 may be coordinated, e.g. in terms of timing, to provide a wide range of current limitation or interruption functions, such as:
  - modifying the profile of the current 46 flowing between the first and second terminals 22,24 in order to, for example, modify any associated transient over-voltages;
  - temporarily limiting, rather than interrupt, the current 46 flowing between the first and second terminals 22,24 to allow for fault location discrimination;
  - aborting the current limitation or interruption operation in the event of a false operation.

The foregoing embodiments of the invention are described with reference to DC circuit interruption devices, but it will be appreciated that the foregoing embodiments of the invention are applicable mutatis mutandis to AC circuit interruption devices. Such AC circuit interruption devices are configured to conduct and interrupt an alternating current flow. This is achieved by constructing each of the first and third switching elements as a bidirectional switching element. For example, each of the first and third switching elements may be configured to be or include a pair of anti-parallel connected switching devices.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. A circuit interruption device comprising:
    first and second terminals for connection, in use, to a respective electrical circuit or network;
    a current-conductive branch including first, second and third current-conductive branch portions successively connected in series between the first and second terminals, the first current-conductive branch portion including a first switching element, the second current-conductive branch portion including a second switching element, the third current-conductive branch portion including a third switching element, each switching element configured to be switchable to selectively permit and block a flow of current in the respective current-conductive branch portion;
    first and second current bypass paths, the first current bypass path connected across the first and second current-conductive branch portions, the second current bypass path connected across the second and third current-conductive branch portions; and
    a controller configured to selectively control the switching of the switching elements to control a flow of current between the first and second terminals so that:
        (i) in a first mode of operation of the circuit interruption device, the current is permitted to flow through the first, second and third current-conductive branch portions and is blocked from flowing through the current bypass paths; and
        (ii) in a second mode of operation of the circuit interruption device, the current is blocked from flowing through the first and third current-conductive branch portions and is permitted to flow through the current bypass paths so as to reverse a direction of current flowing through the second current-conductive branch portion.

2. The circuit interruption device according to claim 1 wherein the controller is configured to selectively control the switching of the switching elements to control the flow of current between the first and second terminals so that, in a third mode of operation of the circuit interruption device, the current is blocked from flowing through the second current-conductive branch portion and is permitted to flow through the first and third current-conductive branch portions and the current bypass paths.

3. The circuit interruption device according to claim 1 wherein the first current bypass path includes a first energy storage device and/or wherein the second current bypass path includes a second energy storage device.

4. The circuit interruption device according to claim 1 including a third current bypass path connected across the first and second terminals, the third current bypass path including a third energy storage device.

5. The circuit interruption device according to claim 1 including a first energy dissipation or absorption device connected across the second current-conductive branch portion, wherein the controller is configured to selectively control the switching of the switching elements to control the flow of current between the first and second terminals so that, in a fourth mode of operation of the circuit interruption device, the current is blocked from flowing through the second current-conductive branch portion and the current bypass paths and is permitted to flow through the first and third current-conductive branch portions and the first energy dissipation or absorption device.

6. The circuit interruption device according to claim 1 including at least one of:
    a second energy dissipation or absorption device connected across the first and second terminals;
    a third energy dissipation or absorption device connected across the first current bypass path;
    a fourth energy dissipation or absorption device connected across the second current bypass path;
    a fifth energy dissipation or absorption device connected across the first switching element in the first current-conductive branch portion;
    a sixth energy dissipation or absorption device connected across the third switching element in the third current-conductive branch portion.

7. The circuit interruption device according to claim 1 wherein each of the first and third switching elements is a unidirectional switching element, or wherein each of the first and third switching elements is a bidirectional switching element.

8. A circuit interruption assembly comprising at least one circuit interruption device connected in series with at least one isolator, wherein the or each circuit interruption device is in accordance with claim 1.

9. A circuit interruption assembly comprising a plurality of circuit interruption devices, each circuit interruption device in accordance with claim 1, wherein each controller of the circuit interruption devices is configured to control the switching of the switching elements of the corresponding circuit interruption device so that the circuit interruption devices initiate the same mode of operation at the same time or at different times.

10. A circuit interruption assembly according to claim 9 wherein at least one of the plurality of circuit interruption devices has a voltage rating that is the same as or different to at least one other of the plurality of circuit interruption devices.

11. A circuit interruption assembly according to claim 9 wherein at least one of the plurality of circuit interruption devices has an energy storage device rating that is the same as or different to at least one other of the plurality of circuit interruption devices.

12. A method of operating a circuit interruption device, the circuit interruption device comprising:
    first and second terminals for connection, in use, to a respective electrical circuit or network;
    a current-conductive branch including first, second and third current-conductive branch portions successively connected in series between the first and second terminals, the first current-conductive branch portion including a first switching element, the second current-conductive branch portion including a second switching element, the third current-conductive branch portion including a third switching element, each switching element configured to be switchable to selectively permit and block a flow of current in the respective current-conductive branch portion; and first and second current bypass paths, the first current bypass path connected across the first and second current-conductive branch portions, the second current bypass path connected across the second and third current-conductive branch portions, wherein the method comprises the steps of:

selectively controlling the switching of the switching elements in a first mode of operation of the circuit interruption device so that a flow of current between the first and second terminals is permitted to flow through the first, second and third current-conductive branch portions and is blocked from flowing through the current bypass paths; and selectively controlling the switching of the switching elements in a second mode of operation of the circuit interruption device so that the current is blocked from flowing through the first and third current-conductive branch portions and is permitted to flow through the current bypass paths so as to reverse a direction of current flowing through the second current-conductive branch portion.

13. The method according to claim 12 including selectively controlling the switching of the switching elements in a third mode of operation of the circuit interruption device so that the current is blocked from flowing through the second current-conductive branch portion and is permitted to flow through the first and third current-conductive branch portions and the current bypass paths.

* * * * *